US011321350B2

(12) United States Patent
Schrum

(10) Patent No.: US 11,321,350 B2
(45) Date of Patent: May 3, 2022

(54) MANAGING IDENTIFIERS FOR MULTINODAL MASTER SYSTEMS OF UNKNOWN OR CHANGING SIZE

(71) Applicant: ORACLE INTERNATIONAL CORPORATION, Redwood Shores, CA (US)

(72) Inventor: Allan George Schrum, Wilsall, MT (US)

(73) Assignee: Oracle International Corporation, Redwood Shores, CA (US)

( * ) Notice: Subject to any disclaimer, the term of this patent is extended or adjusted under 35 U.S.C. 154(b) by 268 days.

(21) Appl. No.: 16/595,587

(22) Filed: Oct. 8, 2019

(65) Prior Publication Data

US 2021/0103599 A1    Apr. 8, 2021

(51) Int. Cl.
| | | |
|---|---|---|
| G06F 16/27 | (2019.01) | |
| H04L 29/08 | (2006.01) | |
| G06F 16/23 | (2019.01) | |
| G06F 16/25 | (2019.01) | |
| H04L 67/1042 | (2022.01) | |

(52) U.S. Cl.
CPC .......... *G06F 16/27* (2019.01); *G06F 16/23* (2019.01); *G06F 16/254* (2019.01); *H04L 67/1051* (2013.01)

(58) Field of Classification Search
CPC ........ G06F 16/27; G06F 16/23; G06F 16/254; H04L 67/1051; H04L 67/1097
USPC ....................................................... 707/610
See application file for complete search history.

(56) References Cited

U.S. PATENT DOCUMENTS

| | | | | |
|---|---|---|---|---|
| 5,884,322 | A | * | 3/1999 | Sidhu ................ H04L 29/12254 |
| 6,457,053 | B1 | * | 9/2002 | Satagopan ........ H04L 29/12283 |
| | | | | 707/999.2 |
| 7,584,174 | B2 | | 9/2009 | Blanco et al. |
| 7,702,741 | B2 | | 4/2010 | Yuan et al. |

(Continued)

OTHER PUBLICATIONS

Brandon Strittmatter; Mastering Multi Master With Kubernetes, downloaded on Oct. 1, 2019 from: https://blog.containership.io/multimaster/; pp. 1-7.

(Continued)

*Primary Examiner* — Michael Pham
(74) *Attorney, Agent, or Firm* — Kraguljac Law Group, LLC

(57) ABSTRACT

Systems, methods, and other embodiments associated with distributed primary identifier management in a multi-master database system are described. One embodiment includes: Receiving a request to add a new master node to a multi-master database environment. Retrieving the next available master node number from a master node counter for the database environment. Generating a numeric base for primary identifiers of data objects of the new master node by deriving high order bits of the numeric base from the retrieved master node number. Configuring the new master node to assign the next unassigned number in a sequence of numbers beginning with the numeric base as the primary identifier for each data object created by the new master node. Add the new master node to the database environment. In one embodiment, the numeric base is generated by replacing the leading bits of the primary identifier range with the reversed the binary equivalent of the node number of the new master node.

20 Claims, 6 Drawing Sheets

(56) References Cited

U.S. PATENT DOCUMENTS

| | | | |
|---|---|---|---|
| 9,984,140 B1* | 5/2018 | Sukumaran | G06F 16/219 |
| 2007/0276833 A1* | 11/2007 | Sen | G06F 16/27 |
| 2010/0114826 A1* | 5/2010 | Voutilainen | H04L 67/1095 |
| | | | 707/638 |
| 2014/0237095 A1* | 8/2014 | Bevilacqua-Linn | |
| | | | H04L 41/042 |
| | | | 709/223 |

OTHER PUBLICATIONS

Wikipedia; Kubernetes, downloaded on Sep. 24, 2019 from: https://en.wikipedia.org/w/index.php?title=Kubernetes&oldid=917337364; pp. 1-7.

* cited by examiner

MANAGING IDENTIFIERS FOR MULTINODAL MASTER SYSTEMS OF UNKNOWN OR CHANGING SIZE

BACKGROUND

Database nodes serving client computers in distant locations are often subject to performance reductions due to communications latencies between the database node and the client computer. Generally, as the distance between the database node and the client computer increases, performance is reduced based on the accumulated latencies between the database node and the client computer.

Initially, this problem was addressed by designating one database node to be a master node and adding one or more replication nodes (copies of the master node) close to concentrations of client computers. In this configuration, the master node is available for each of the create, read, update, delete (CRUD) operations, and the replication nodes are only available for read operations. The client computers have increased performance for read operations, but still suffer the same performance problems for create, update, and delete operations.

In an attempt to overcome these problems, database systems including multiple master nodes have been devised. In this configuration, master nodes (offering the full set of CRUD operations) are created close to concentrations of client computers instead of replication nodes only available for read operations. This configuration improves performance for all CRUD operations, but brings with it the problem of potential collisions of primary identifiers for data objects. Primary identifiers are intended to be unique, but two different master databases may each create a unique data object, and then both master databases can inadvertently assign the same primary identifier to the two unique data objects.

In a multi-master database system the problem of assignment of unique primary identifiers across the nodes is solved either through a centralized service, or in a distributed manner. The term "snowflake" is often used to describe methods that can provide a decentralized unique identifier for use within a multi-master environment. The most common distributed approach is to know a priori how many master nodes are in the system (assume n-nodes), and to then assign each master node an offset (o) ranging from 0 to n. Then the value of the identifier is set to k*n+o where k is a local counter.

For example, in a multi-master system of two databases, one master node is given the even numbers and the other the odd numbers. In a multi-master system of three databases, one node is given offset zero and creates identifiers like 0, 3, 6, etc., another node is given offset one and creates identifiers like 1, 4, 7, etc., and the remaining node is given offset two and creates identifiers like 2, 5, 8, etc.

A major disadvantage of this approach is that it depends on the number of master nodes being fixed (n remains constant). Changing the number of master nodes (by adding or removing a node) requires stopping (or quiescing) all the master nodes in the multi-master database system in order to consistently change all master nodes to update them with the new value of n. If the configuration of the existing master nodes is changed to describe addition of a new master node to the system without first quiescing all the existing master nodes, then there will exist a race condition between all the nodes as to when the configuration change is received and applied. Because of that race condition it is possible that new data objects may be created with primary identifiers that inadvertently conflict. If the operations to change configuration are fast relative to the frequency of creation of new data objects, then the duration of this race condition is small and the likelihood of identifier collision is small, but not zero. If the operations to change the configuration are slow relative to the frequency of creation of new data objects, one master node may create new data objects with primary identifiers according to the new configuration while other master node continues to create new data objects with primary identifiers according to the old configuration.

A simple demonstration involves a multi-master database system of two master database nodes being upgraded to include three master database nodes. The first two master nodes initially operate on an even/odd basis for the values of their primary identifiers. The new configuration will instruct these two master nodes that three master nodes exist and that the two nodes now have offsets zero and one, while the new node is assigned offset two. The first node generates ID values (even) when at a time t the master node is told there are now three nodes. The sequence of primary identifiers generated by the first node might be 0, 2, 4, 6, 8 (time t occurs), 9, 12, 15, 18, 21, etc. The second node is told at time t+1 creating a gap in time between when the nodes respond to the change. The second node might generate primary identifiers 1, 3, 5, 7, 9, 11, 13, 15 (time t+1 occurs), 19, 22, 25, etc. As shown in this example, the primary identifiers 9 and 15 collide between these nodes due to the race condition created. Similar race conditions may be created when a node is removed from the multi-master database system.

It is impossible to synchronize this type of change without quiescing the nodes. This form of quiescing might be called "locking", "pausing", "synchronizing", etc., but it amounts to stopping the database nodes from operating until the configuration change is made in all of the database nodes. The master nodes can be restarted or released after the configuration change is made to all master nodes.

The requirement to quiesce the nodes results in undesirable unavailability of any master database node in the multi-master database system. This approach is especially inappropriate where the number of master nodes is expected to change often.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
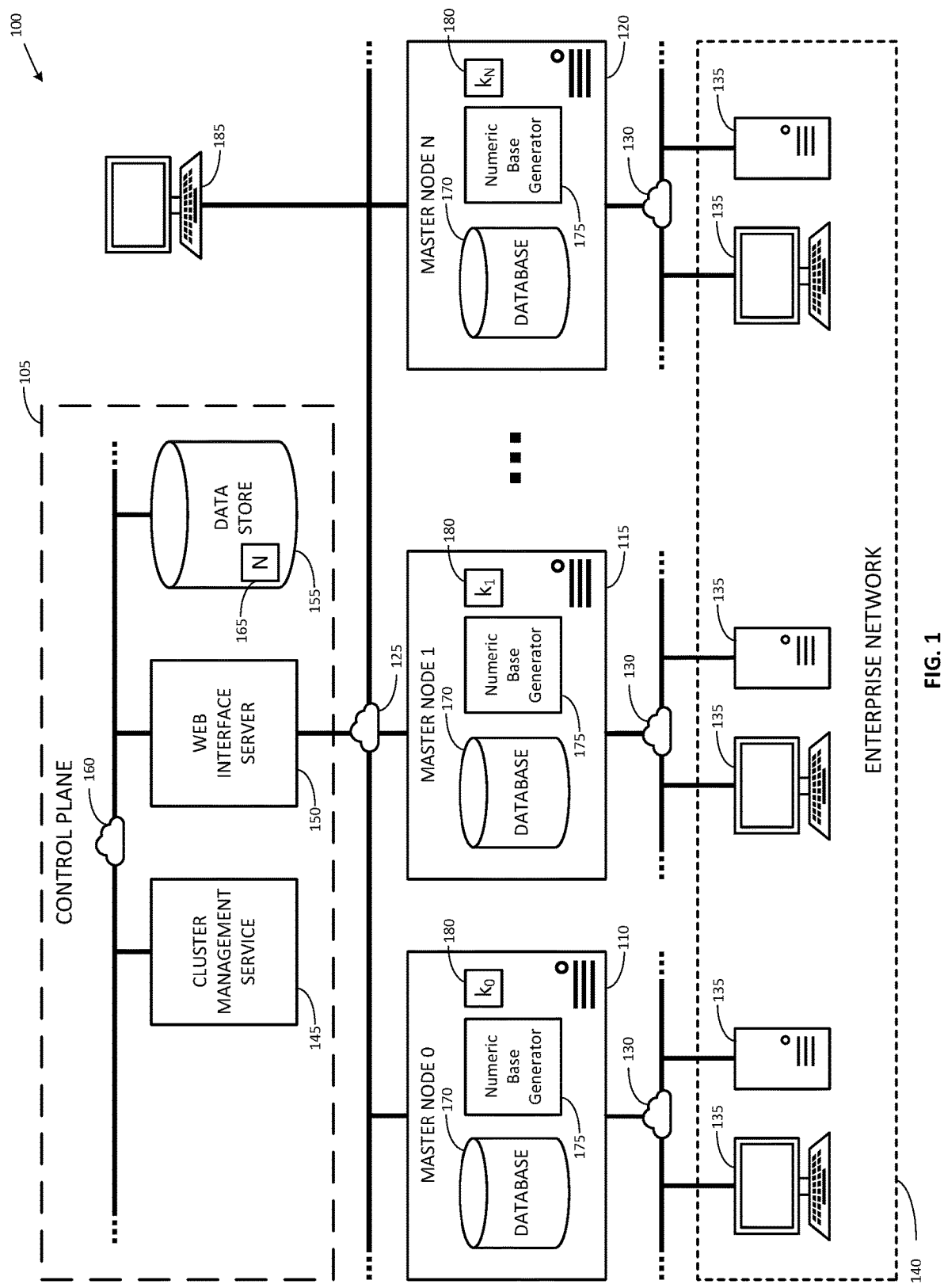
FIG. 1 illustrates one embodiment of a multi-master database system associated with distributed management of the assignment of unique identifiers across an unknown or changing number of master nodes to avoid collisions in a multi-master database system.

Systems and methods are described herein that provide for distributed management of the assignment of unique identifiers across an unknown or changing number of master nodes to avoid collisions in a multi-master database system. These systems and methods provide a new "snowflake" approach for decentralized or distributed provision of unique identifiers in a multi-master database environment. The systems and methods avoid the requirement to quiesce or stop the other master nodes when adding a node to or removing a node from the multi-master database system in order to prevent inadvertent creation of data objects with primary identifiers that collide. In one embodiment, the systems and methods accomplish this by deriving a base or starting point of a local counter for each master node from a node identifier of the master node. The system labels each master node that is added in the multi-master database system with a node identifier from 0 to n. The equivalent binary value of that label is computed and reversed in bit order, and is used as the higher-order bits of the identifier. This creates, for each master node, a starting point (or numeric base) for the primary identifiers that is unique to the master node. A local counter for the master node can then be added to the starting point to create a primary identifier for a new object that is unique across all master nodes in the multi-master database system. In practice, adding a new master node to system encroaches on space previously reserved for other master nodes, but does so in a way that minimizes the risk of collisions because it is in a range that is most likely unused. Removing a node potentially expands the range available to other nodes depending on the size of the identifier being generated.

For example, assume a multi-master database system (i) including five master nodes numbered 0, 1, 2, 3, and 4; and (ii) allowing a range of primary identifiers that would fill a 64-bit integer. According to the process described above, each master node will have its bit range reversed and used as a prefix for the 64-bit integer that will then be used for values assigned using a local counter of the master node. Thus node 0 (the first node) will have reversed bits of 0 and will be assigned 0x0000000000000000 as the base to increment. (The bases are expressed here in hexadecimal for convenience.) For node 1 the reversed bits are 1 and node 1 will be assigned 0x8000000000000000 as the base to increment. For node 2 (binary 10) the reversed bits are 01 and node 2 will be assigned 0x4000000000000000 as the base to increment. For node 3 (binary 11) the reversed bits are 11 and node 3 will be assigned 0xC000000000000000 as the base to increment. For node 4 (binary 100) the reversed bits are 001 and node 4 will be assigned 0x2000000000000000 as the base to increment.

As seen in the example above, as more master nodes are added the available space is further sub-divided to allow for the new master node to be added without collision. Each new master node cleaves into a range of space previously assigned to other master nodes, but given the size of the range to be divided, collisions do not happen in practice. Thus, a multi-master system can add or remove master nodes on-the-fly without requiring quiescing/stopping all master nodes for reconfiguration of all master nodes. Only the new master node being added must be configured. All other master nodes can continue operating without requiring knowledge of the new node.

Notably, the limits on this approach depend on the size of the identifier being manipulated. Using a 64-bit identifier essentially eliminates all collisions as the number of values available is so large. Thus, this approach can be extended to any practicable number of master nodes without seriously increasing the risk of a collision. For example, in the example above, the full range of unique primary identifiers available in a 64-bit unsigned integer is 0 through $2^{64}-1$. (18,446,744,073,709,551,615). This is over 18.4 quintillion possible unique identifiers. The process described has the practical effect of evenly splitting the previously assigned ranges to accommodate the assignment of a new master node. The smallest primary identifier space assigned to a master node is expressed by the number of unique primary identifiers available in the system divided by two to the power of the number of bits required to express the highest numbered node. Thus, at five master nodes (node 4) in the example above, the smallest primary identifier space assigned to a master node is $(2^{64})/(2^3)$, (three bits being needed to express node 4 (binary 100)). (2,305,843,009,213,693,952). This is over 2.3 quintillion possible unique identifiers. Even at a high number of master nodes, such as, for example, 1000, there are over 18 quadrillion possible unique primary identifiers reserved for each master node where the multi-master database system allows a range of primary identifiers that would fill an unsigned 64-bit integer.

In one embodiment, N master nodes in a multi-master database system are assigned numeric values starting with 0 and up to N−1. Each assigned numeric value of a node has an integer value, $(2^B)-1$ that exceeds the assigned numeric value where B is the smallest possible positive integer (the minimum value of B is 1). For each node, the value of B that satisfies these conditions is determined. The binary value of the node's numeric value is determined, and the order of the bits in that binary value are reversed. The resulting value may be referred to as V. The numeric base for the node is the reversed value V shifted to the left of the primary identifier range, that is, replacing the high order bits of the primary identifier range. The numeric base for the primary identifiers generated by the master node forms the base, or starting point for a counter used to create unique identifiers for the master node. The numeric base thus ensures that unique identifiers generated by the master node are also unique in the multi-master database system.

Example Environment

FIG. 1 illustrates one embodiment of a multi-master database system 100 associated with distributed management of the assignment of unique identifiers across an unknown or changing number of master nodes to avoid collisions in a multi-master database system. The multi-master database system 100 includes a control plane 105, and multiple master nodes, master node 0 (110), master node 1 (115), though master node N (120), all interconnected by a network 125. The multi-master database system 100 may be offered as a service over a network 130 (such as the Internet) to client computers 135 associated with an enterprise network 140 of an enterprise.

The client computers 135 may be of a wide variety of computing devices. Examples of suitable computing devices include server computers, personal computers such as desktop, laptop or notebook computers, tablet computers or personal digital assistants (PDAs), cell phones, smart phones, or other mobile devices, machine control devices, and other electronic devices incorporating one or more computing device components, such as one or more electronic processors, microprocessors, central processing units (CPU), or controllers. Each client computer 135 incorporates one or more client software applications that allow the client computers to initiate create, read, update, or delete (CRUD) operations in the multi-master database environment.

In one example, the client software applications may be specific to a particular business purpose, such as a sales lead tool, or an incident tracking system, and have a set of operations that it may perform that is limited to that particular business purpose. In another example, the client software application may be a general-purpose database management tool, and enable both general manipulation of data stored in the multi-master database environment, and manipulation of the schemas of the multi-master database environment. These client software applications may include graphical user interfaces (GUIs) that incorporate GUI elements for gathering information and commands from the users of the multi-master database system. These GUI elements include a variety of graphical buttons, radio buttons, check boxes, text boxes, menus such as drop-down menus, and other elements.

In one embodiment, control plane 105 includes a cluster management service 145, a web server 150, and a data store 155, each operably connected by a network 160. In some embodiments, any or all of the includes a cluster management service 145, a web server 150, and a data store 155 may be implemented on one or more different hardware systems and components, even though represented as single units in FIG. 1. In some example configurations, data store(s) 155 may be implemented using a network-attached storage (NAS) device or other dedicated server device.

Examples of suitable networks for networks 125, 130, and 160 include networks utilizing wired and/or wireless communication technologies and networks operating in accordance with any suitable networking and/or communication protocol (e.g., the Internet).

In one embodiment, in control plane 105, web interface server 150 is configured and adapted to interface with the cluster management service 145 and the data store 155 to control the workload and communication among the nodes of the multi-master database system, including master node 0 (110), master node 1 (115), though master node N (120).

In one embodiment, data store 155 stores the configuration data of the multi-master database system that represent the state of the multi-master database system. For example, data store 155 may store a master node counter 165 that is incremented by web interface server 165 each time a master node is added to the multi-master database system 100. A master node is assigned the current value of this counter as its node number when the master node is added to the multi-master database system.

In one embodiment, web interface server 150 acts as an Application Programming Interface (API) server which processes representational state transfer (REST) API requests to and from the master nodes 110, 115, 120 in the multi-master database system. The web interface server also manages the representation of the state of the multi-master database system in data store 155. In one embodiment, each master node 110, 115, 120, may communicate with the other master nodes and the control plane by REST API requests. The REST API requests are electronic messages that include commands that may be sent (transmitted) over a network. The REST API are executed by recipient computing devices that have a compatible API (an API that is configured to process the particular commands included in the REST API requests. In one embodiment, REST API requests are used to propagate data objects created by one master node to the other master nodes for insertion into the databases of the other master nodes (and, in one embodiment, to the control plane 105 for inclusion in data store 155).

In one embodiment, each master node 110, 115, 120 in the multi-master database system operates a database 170 that is updated according to actions performed by any master node in the system. Thus, the databases 170 are mirrors of each other. In one embodiment, the data store 155 also includes a mirror copy of the database 170 of the master nodes 110, 115, 120 in the multi-master database system. For example, the updates (including propagation of new data objects) may be performed by REST API requests.

In one embodiment, each master node 110, 115, 120 in the multi-master database system also includes a numeric base generator 175 which is run at the initial startup of each master node 110, 115, 120 in order to determine the numeric base for that master node, as discussed with greater detail herein. In another embodiment, (not shown) the numeric base generator is run in the control plane 105, for example by the cluster management service 145 or the web interface server. Regardless of where the numeric base is generated, a unique numeric base is generated for each of the master nodes in the multi-master database system, and provided to those master nodes at their initial configuration, before they perform any operations.

In one embodiment, each master node 110, 115, 120 in the multi-master database system also includes a local counter 180 used for assigning primary identifiers to data objects created by the master node. The local counters 180 are unique to the master nodes. In one embodiment, the local counter is initialized at 0 and the master node adds the numeric base to the current value of the local counter and assigns the resulting sum to a newly created data object as its primary identifier. In another embodiment, the local counter is initialized at the value of the numeric base and the master node assigns the current value of the local counter to a newly created data object as its primary identifier. For any given numeric base, both of these embodiments generate the same series of primary identifiers. In both of these embodiments, the local counter is incremented following an assignment of the current value as a primary identifier. In one embodiment, the local counter may be a sequence number, a data object that increments its current value following each retrieval of its value.

In one embodiment, the multi-master database system is a multi-master Kubernetes® cluster. Kubernetes® is a container management software system. A container is a process management tool that encapsulates an environment for the purpose of running a specific set of tools or processes. One example of such a container is a Docker® container.

In one embodiment, the control plane 105 operates the Kubernetes® container management software. In this configuration, the data store 155 may include an etcd key-value store. In this configuration, several containers can be created to handle the work of a single database master node. The Kubernetes® software in the control plane 105 manages (starts, stops, scales, monitors, etc.) the containers. If the Kubernetes® software determines a node is down when it is expected to be up, it will restart that node. If a new version of the container is available (perhaps due to an upgrade of the software for operating the node) then the Kubernetes® software will gracefully start up the new node, route requests to that new node and then gracefully shutdown the old node. The exact procedures these management operations are under the control of the developer, who may create rules for management to be used by the Kubernetes® software. All this metadata for management of the system is stored in the etcd key-value store in the data store 155 of the control plane 105 so that the system can be restored to its known state easily.

In one embodiment, the database, numeric base generator, and local counter are all deployed to the master node in one or more containers.

While the management of the containers is performed by the Kubernetes® software, the initial creation of the containers is typically a job performed by developer. In one embodiment, the developer creates a generic master database node that can be deployed to a computing device to cause it to operate as a master node such as master nodes 0-N 110, 115, 120 in the multi-master database system 100. In one embodiment, the generic master database node includes several docker containers which each provide a unique service or capability of the generic master node. By using multiple containers, the complexity of the individual container is decreased and the overall operations are decoupled to allow for each container to be developed and maintained independently. This is an example of a micro-service environment. The generic master node may therefore include one or more containers to provide various functionality of the generic master node.

When the Kubernetes® software starts up a deployed generic master node in the context of getting the system into the state determined by the control plane 105, the deployed master node is also told what node it is (that is, provided with its node number by the control plane) as part of its start-up parameters. That node number is then used to generate unique identifiers as required, as described in greater detail herein. Kubernetes® software and container technology provide a way to abstract the database node software so that it is not assigned a number until it is deployed to hardware and used. This means that the ability to reuse containers makes development and maintenance of the database nodes much simpler (even with the complexity of making the node generic). Thus, the use of the Kubernetes® software and container technology provide a viable environment for a multi-master database system to exist and to be maintained.

In one embodiment, the multi-master database system 100 includes an administration computing device 185 associated with a customer or an administrator of the multi-master database system 100. The web interface server 150 is configured to provide to the administration computing device 185 a graphical user interface including configuration options for the multi-master database system. An authorized administrator or customer of the multi-master database system 100 may request changes to the configuration of the multi-master database system 100 using the administration computing device 185, and the control plane will effect the requested changes. In one embodiment, the web interface server 150 is configured to provide to the administration computing device 185 a graphical user interface for providing payment for services provided by the multi-master database system 100, or for changes to the configuration of the multi-master database system 100.

Example Method

Computer-implemented methods for distributed management of the assignment of unique identifiers across an unknown or changing number of master nodes to avoid collisions in a multi-master database system, and for various features related to such distributed management of the assignment of identifiers, are described in this specification. In one embodiment, one or more computing devices (such as computer 805, shown and described with reference to FIG. 8) with operably connected processor (such as processor 810) and memory (such as memory 815) and other components may be configured with logic (such as multi-master distributed unique identifier management logic 830) that causes the computing device to perform steps of the method. For example, the processor accesses and reads from or writes to the memory to perform the steps shown and described with reference to FIG. 2. These steps may include (i) retrieving any necessary information, (ii) calculating, determining, generating, classifying, or otherwise creating any data, and (iii) storing any data calculated, determined, generated, classified, or otherwise created. In one embodiment, the methods described herein may be performed by one or more of the master nodes 110, 115, and 120.

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Figure 2:
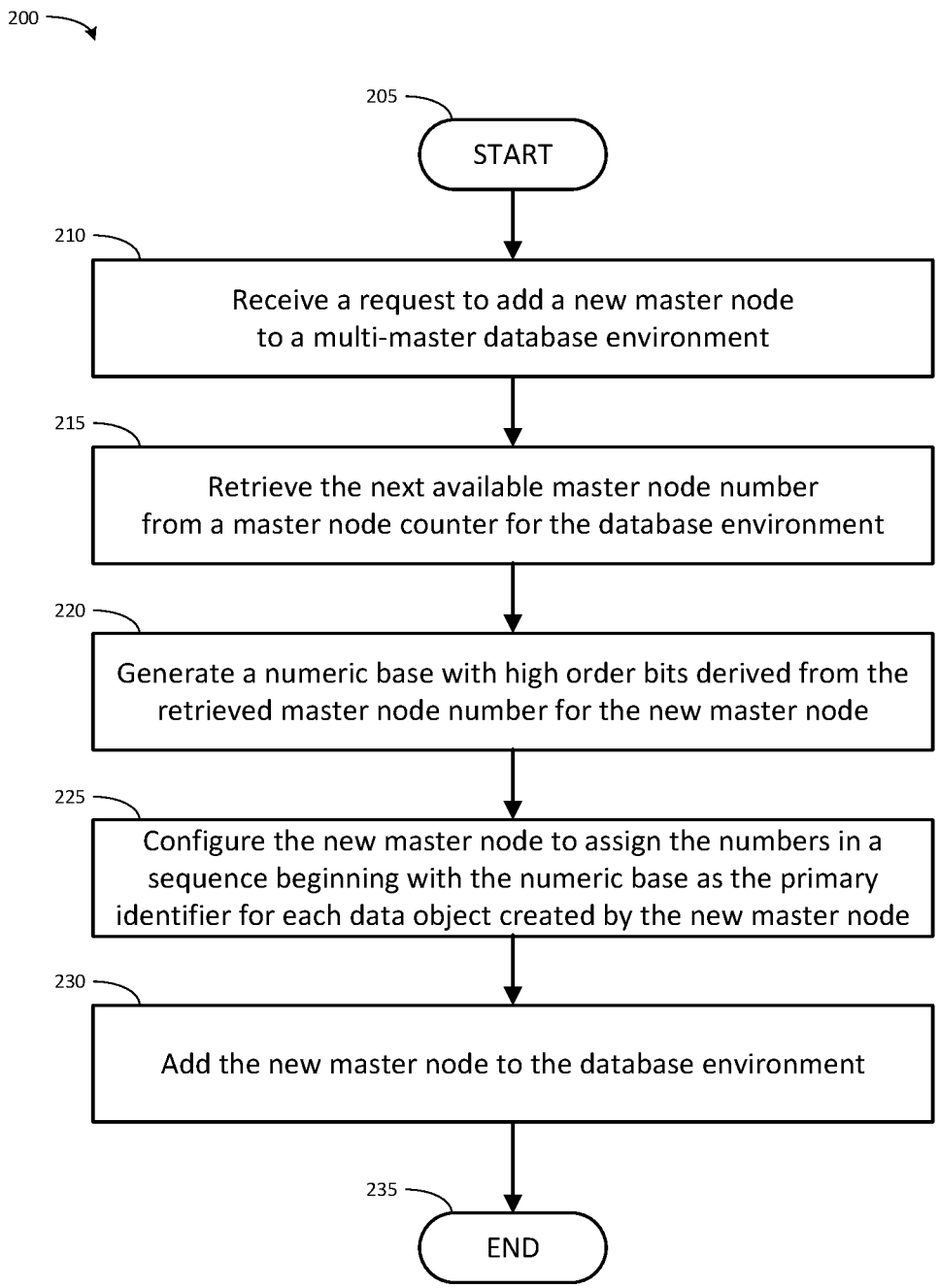
FIG. 2 illustrates one embodiment of a method associated with distributed management of the assignment of unique identifiers across an unknown or changing number of master nodes to avoid collisions in a multi-master database system.

FIG. 2 illustrates one embodiment of a method 200 associated with distributed management of the assignment of unique identifiers across an unknown or changing number of master nodes to avoid collisions in a multi-master database system. In one embodiment, the steps of method 200 are performed by one or more of the master nodes 110, 115, and 120.

The method 200 may be initiated based on various triggers, such as receiving a signal over a network or parsing stored data indicating that (i) a user (or administrator) of a multi-master database system (such as multi-master database system 100 discussed herein with reference to FIG. 1) has initiated method 200, (ii) that that method 200 is scheduled to be initiated at defined times or time intervals, (iii) that a customer has purchased additional node support for the multi-master database system, or (iv) that a control system for the multi-master database system (such as control plane 105 discussed herein with reference to FIG. 1) has determined that the usage of the multi-master database system requires additional node support.

The method 200 initiates at START block 205 in response to parsing a signal received or stored data retrieved and determining that the signal or stored data indicates that the method 200 should begin. Processing continues to process block 210.

At process block 210, the processor receives a request to add a new master node to a multi-master database environment.

In one embodiment, the processor accepts a message transmitted over a network that includes a request that (i) computer hardware be configured to be the new master node and (ii) the new master node be added to the multi-master database system. This message may be sent in response to a customer's selection of an option to add a new master node to the multi-master database environment in a customer control or account control graphical user interface (GUI) for the multi-master database system. The processor parses the received request to determine whether the message includes a request to add the new master node to the multi-master database environment. If the message includes a request to add the new master node, an indication that the new node is to be added is stored in a data structure in memory. These steps serve to instruct the multi-master database system to add a new master node.

Once the processor has thus completed receiving a request to add a new master node to a multi-master database environment, processing at process block 210 completes, and processing continues to process block 215.

At process block 215, the processor retrieves the next available master node number from a master node counter for the database environment.

In one embodiment, N master nodes in a multi-master database system are sequentially assigned numeric values starting with 0 and up to N−1. In one embodiment, the control plane 105 maintains a master node counter (such as master node counter 165 shown and described with reference to FIG. 1) with the next available node number. The master node counter begins at 0 and is incremented by one every time a master node is added to the multi-master database environment. For example, where the multi-master database environment already has N nodes, numbered 0 through N−1, the master node counter is set to N, the next available master node number. The new master node is assigned the numeric value of N to be its node number. The master node counter is incremented.

In one embodiment, the processor generates an electronic message that will cause the control plane to provide the current value of the master node counter. The current value from the master node counter is retrieved, and the master node counter is incremented. The retrieved current value is stored in a data structure in memory that indicates that the retrieved current value is assigned to the new master node as its node number.

Once the processor has thus completed retrieving the next available master node number from a master node counter for the database environment, processing at process block 215 completes, and processing continues to process block 220.

At process block 220, the processor generates a numeric base for primary identifiers of data objects of the new master node by deriving high order bits of the numeric base from the retrieved master node number.

In one embodiment, the processor generates the numeric base by replacing the leading bits of the primary identifier range with the reversed the binary equivalent of the node number of the new master node, as shown and described in further detail with reference to FIG. 3 herein. Thus, the high order bits of the numeric base are derived from the retrieved master node number. This particular method has the advantage of progressively halving the ranges dedicated to each master node added to the multi-master database system, thus utilizing the available address space as much as possible. Reversing the bits has the additional advantage of not requiring advance knowledge of the length of the binary equivalent.

Other methods for deriving high order bits of the numeric base from the retrieved master node number may also be appropriate.

Once the processor has thus completed generating a numeric base for primary identifiers of data objects of the new master node by deriving high order bits of the numeric base from the retrieved master node number, processing at process block 220 completes, and processing continues to process block 225.

At process block 225, the processor configures the new master node to assign the next unassigned number in a sequence of numbers beginning with the numeric base as the primary identifier for each data object created by the new master node.

In one embodiment, the processor initializes a local counter local to the new master node to (i) start counting at the numeric base and (ii) increment by 1. For example, the local counter may be an Oracle® database sequence number, which may be configured with a starting point (of the numeric base) and an increment (in this case, 1, although other values may also be appropriate), and which automatically increments each time it is referenced. The processor configures the new master node to retrieve the next unassigned number in the local counter (and increment the counter) at the creation of a new data object. The processor configures the new master node to assign the retrieved unassigned number to the new data object as its primary identifier.

In one embodiment, the processor creates the proper schema for the database of the multi-master database environment and populates the tables with the data objects that already exist in the system.

Once the processor has thus completed configuring the new master node to assign the next unassigned number in a sequence of numbers beginning with the numeric base as the primary identifier for each data object created by the new master node, processing at process block 225 completes, and processing continues to process block 230.

At process block 230, the processor adds the new master node to the database environment.

In one embodiment, the processor generates a message that indicates that the new master node is configured to accept and process create, read, update, and delete (CRUD) operations. The processor sends the message to the control plane. The control plane parses the message to determine whether the new master node is configured to accept and process CRUD operations. In response to determining that the new master node is configured to accept and process CRUD operations, the control plane directs requests for CRUD operations from computing devices associated with users of the multi-master database system to the new master node. In one embodiment, the message is a REST API request.

Once the processor has thus completed adding the new master node to the database environment, processing at process block 230 completes, and processing continues to END block 235, where process 200 ends.

In one embodiment, the processor includes one or more processors of computer hardware that will be configured to be the new master node, and the steps of method 200 are performed by a software module installed on the computer hardware that is configured to manage receipt and processing of such messages. In another embodiment, the processor includes one or more processors of the control plane, and the steps of method 200 are performed by a software module installed in the control plane that is configured to manage receipt and processing of such messages. In another embodiment, the processor includes one or more processors of both (i) computer hardware that will be configured to be the new master node and (ii) the control plane, and the steps of method 200 are performed by software modules installed in either the computer hardware or the control plane.

Example Generation of a Numeric Base

Figure 3:
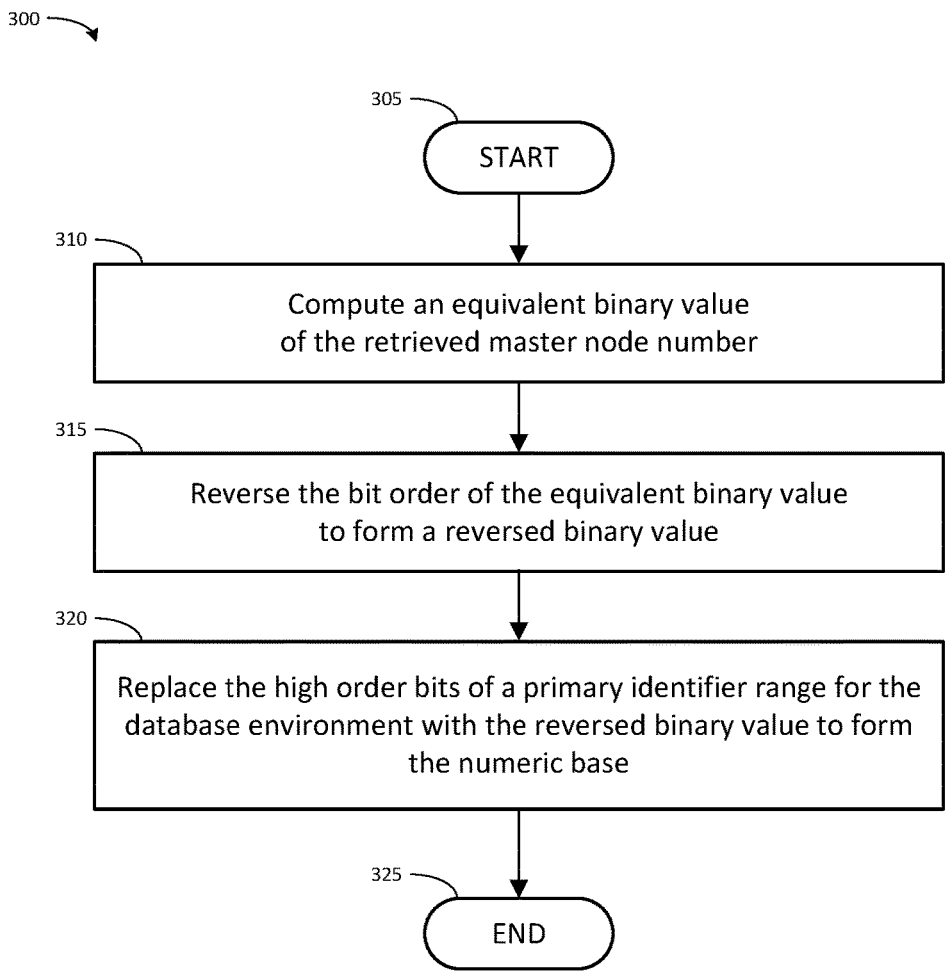
FIG. 3 illustrates one embodiment of a method associated with deriving high order bits of a numeric base from a retrieved master node number.

FIG. 3. shows one embodiment of a method 300 for deriving high order bits of the numeric base from the retrieved master node number. The method 300 may be initiated based on various triggers, such as receiving a signal over a network or parsing stored data indicating a request for generation of new numeric base. In one embodiment, method 300 is initiated as part of a larger process, such as process block 220 of method 200. The method 300 initiates at START block 305 in response to parsing a signal received or stored data retrieved and determining that the signal or stored data indicates that the method 300 should begin. Processing continues to process block 310.

At process block 310, the processor computes an equivalent binary value of the retrieved master node number.

The new master node has been assigned the numeric value N. In one embodiment, the equivalent binary value of the retrieved master node number N can be obtained by starting with N as the initial input decimal value dividing the input decimal value by 2, storing the remainder, and repeating the process using the resulting quotient as the new input decimal value until the quotient reaches 0. The sequence of remainders, in reverse temporal order of calculation, is the equivalent binary value of the retrieved master node number N assigned to the new master node. The processor may perform this algorithm, and store the resulting sequence of remainders in a data structure in memory.

Other algorithms for obtaining the equivalent binary value of the retrieved master node number may also be suitable. Existing software functions for obtaining the equivalent binary value of an integer may also be used. For example, the processor may execute the C# function Convert.ToString (N, 2), which outputs the string of the value of N converted to base 2, and store the output in a data structure in memory.

Once the processor has thus completed computing an equivalent binary value of the retrieved master node number, processing at process block 310 completes, and processing continues to process block 315.

At process block 315, the processor reverses the bit order of the equivalent binary value to form a reversed binary value.

In one embodiment, the most significant bit of the equivalent binary value is placed in the least significant bit of the reversed binary value, and the process is repeated, placing the next most significant bit of the equivalent binary value in the next least significant bit of the reversed binary value until no bits remain of the equivalent binary value. The processor may perform this algorithm, and store the resulting reversed binary value in a data structure in memory.

Other algorithms for forming the reversed binary value may also be suitable.

Note also that calculating the equivalent binary value at process block 310 considers the remainders received in reverse temporal order to form the equivalent binary value. In one embodiment, the calculating the equivalent binary value and the reversed binary value need not be discrete steps. Instead, considering the remainders received in process block 310 in ordinary temporal order forms the reversed binary value.

Once the processor has thus completed reversing the bit order of the equivalent binary value to form a reversed binary value, processing at process block 315 completes, and processing continues to process block 320.

At process block 320, the processor replaces the high order bits of a primary identifier range for the database environment with the reversed binary value to form the numeric base.

In one embodiment, the new master node has been assigned the numeric value N. The numeric value N of the new master node has an integer value, $(2^B)-1$ that exceeds the assigned numeric value N, where B is the smallest possible positive integer (the minimum value of B is 1). The value of B that satisfies these conditions for the new master node is determined. This value may be determined, for example, by adding one to the value of the binary logarithm of the assigned numeric value N rounded to the largest previous integer. This is expressed by the formula:

$$B = \lfloor \log_2 N \rfloor + 1 \qquad \text{Eq. 1}$$

The processor replaces the first B bits of the primary identifier range with the bits of the reversed binary value to form the numeric base.

Once the processor has thus completed replacing the high order bits of a primary identifier range for the database environment with the reversed binary value to form the numeric base, processing at process block 320 completes, and processing continues to END block 325, where process 300 ends.

—Structure of Identifiers in Multi-Master Database Environment—

Figure 4:
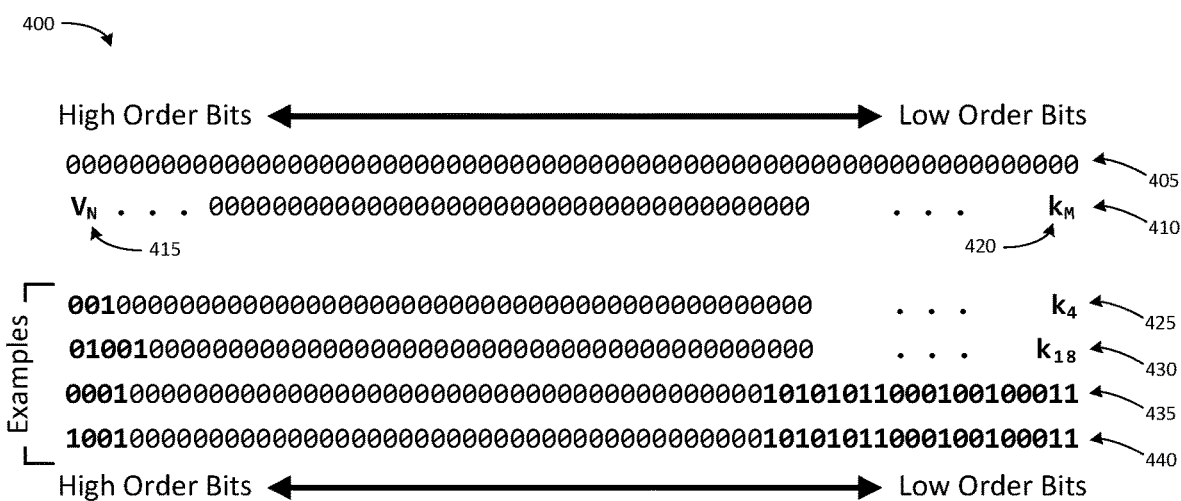
FIG. 4 illustrates one embodiment of a structure of a unique identifier in a 64-bit primary identifier range.

FIG. 4 illustrates one example of a structure 400 of a unique identifier in a 64-bit primary identifier range, such as may be generated by method 300.

In one embodiment, the 64-bit identifier range consists of 64 discrete bits (as shown in row 405) that make up a 64-bit unsigned integer. The high order bits (or most significant bits) are those bit positions in a binary number that that represent the greatest values. The low order bits (or least significant bits) are those bit positions in the binary number that represent the least values. Conventionally, and as shown in the example structure 400, the leftmost bits represent the high order, and the rightmost bits represent the low order. As shown in row 410, the high order bits of a unique identifier generated by a master node are occupied by digits $V_N$ 415 derived from a node number of the master node, and the low order bits of the identifier are occupied by the digits of a local counter $k_M$ 420 for that master node. In one embodiment, the digits $V_N$ 415 are the digits of the decimal node number N of the master node converted to binary, and then reversed in order. Thus, the numeric base for each node N is the reversed value $V_N$ shifted to the left of the primary identifier range, that is, replacing the high order bits of the primary identifier range.

In one embodiment, the local counter used for generating unique primary identifiers for data objects created by the master node is set to start counting at the numeric base. For each data object created by the master node (or each data object that requires a unique primary identifier within the multi-master database system), the current value of the local counter is assigned to the data object as its primary identifier, and the local counter is incremented.

In one embodiment, the local counter used for generating unique primary identifiers for data objects created by the master node is set to start counting at zero. For each data object created by the master node (or each data object that requires a unique primary identifier within the multi-master database system), the current value of the local counter is added to the numeric base, the sum is assigned to the data object as its primary identifier, the local counter is incremented.

Thus, in the 64-bit range, the available address space for each master node is 2^(64-B) unique identifiers, where B is the number of bits required to express the node number of a master node in binary, as discussed above.

For example, for a 64-bit range the numeric base is V*2^(64-B), where V is the reversed sequence of bits of the node number of the master node expressed in binary, and B is the number of bits required to express the node number of a master node in binary, as discussed above. In this example, for node 0, B is 1, V is 0, and its base is 0x0000000000000000;
for node 1, B is 1, V is 1, and its base is 0x8000000000000000;
for node 2, B is 2, V is 01, and its base is 0x4000000000000000;
for node 3, B is 2, V is 11, and its base is 0xC000000000000000;
for node 4, B is 3, V is 001, and its base is 0x2000000000000000, as is further illustrated at row 425 of FIG. 4;
for node 5, B is 3, V is 101, and its base is 0xA000000000000000;
for node 6, B is 3, V is 011, its base is 0x6000000000000000;
for node 7, B is 3, V is 111, and its base is 0xE000000000000000;
for node 8, B is 4, V is 0001, and its base is 0x1000000000000000;
for node 9, B is 4, V is 1001, and its base is 0x9000000000000000;
for node 10, B is 4, V is 0101, and its base is 0x5000000000000000;

and so on. (Numeric bases expressed in hexadecimal for convenience).

Further examples of the structure of unique identifiers in the 64-bit range created in accordance with method 300 are shown in FIG. 4. As shown in each of example rows 425, 430, 435, and 440, the first B bits (where B is the number of bits needed to express the node number of the master node in binary), display the reversed binary of the master node number, while the next 64-B bits (the remaining bits left in the 64-bit range) are reserved for an identifier specific to that particular master node. Note that the zeros shown in the example structure 400 between the reversed binary in the high order, most significant bits and the identifier bits in the low order, least significant bits are not required as a buffer. They are simply shown in the figure because no example shown has identifier bits in the low order that require all 64-B available bits.

Row 425 shows an example structure of a unique identifier in the 64-bit range for data objects created by master node 4 of a multi-master database environment. Binary 4 is 100, and therefore B=3. Thus the first 3 bits are occupied by the reverse binary 4: 001. The remaining 64-3 bits are available to be filled by an identifier unique in node 4, although it may not be unique in the multi-master database environment. In one embodiment, this may be supplied by a local counter local to (included in or operated by) master node 4.

Similarly, row 430 shows an example structure of a unique identifier in the 64-bit range for data objects created by master node 18 of a multi-master database environment. Binary 18 is 10010, and therefore B=5. Thus the first 5 bits are occupied by the reverse binary 18: 01001. The remaining 64-5 bits are available to be filled by an identifier unique in node 18. In one embodiment, this may be supplied by a local counter local to (included in or operated by) master node 18.

Row 435 shows an example individual unique identifier generated by master node 8 in a multi-master database environment. This is identifier 700707 for master node 8. Binary 8 is 1000, and therefore B=4. Thus the first 4 bits of this identifier are occupied by the reverse binary 8: 0001. The numeric base for master node 8 is thus 0x1000000000000000 (or 0b0001000000000000000000000000000000000000000000000000000000000000).
The binary for the identifier 700707, 10101011000100100011, is added to the numeric base to create this unique identifier 435 for master node 8.

Row 440 shows an example individual unique identifier generated by master node 9 in a multi-master database environment. This is identifier 700707 for master node 9. Binary 9 is 1001, and therefore B=4. Thus the first 4 bits of this identifier are occupied by the reverse binary 9: 1001. The numeric base for master node 9 is thus 0x9000000000000000 (or 0b1001000000000000000000000000000000000000000000000000000000000000).
The binary for the identifier 700707, 10101011000100100011, is added to the numeric base to create this unique identifier 440 for master node 9.

Thus, in this example, the data object 700707 from master node 8 can be propagated to all other master nodes in the multi-master database system (including master node 9) without collision with the data object 700707 from master node 9 (and vice versa) because they are each offset by a numeric base that is unique to the respective master nodes. Similarly, any other data object 700707 from other master nodes in the multi-master a such as master nodes 1-7 will not be at risk of collision because each of them will be offset by a numeric base that is particular to the master node in which they originated.

In one embodiment, the primary identifier range is the range of primary identifiers that would fill a 64-bit integer. The 64-bit primary identifier range allows for a number of database nodes so high as to be practically unlimited while leaving ample room to avoid collisions between data objects. For example, in the 64-bit primary identifier range, one could have one million master nodes, and still have over 17.5 trillion unique identifiers available for each master node to assign to data objects before risking a collision. In general, the number of master nodes in a multi-master database system is under 100 nodes. Reducing the number of nodes to this more practicable number dramatically increases the number of unique identifiers available to each node to over 144 quadrillion unique identifiers available for each node before risking a collision. Thus, using a 64-bit unsigned integer as a primary identifier in accordance with the systems and method described herein permits a practically unlimited number of nodes in a multi-master database system to have a practically unlimited number of unique primary identifiers for data objects with almost no risk of collision between data objects. In the rare cases where exceptionally high numbers of nodes or unique identifiers are needed, a larger primary identifier range may be required to remove the risk of collision.

References to the 64-bit integer in this application is used as an example of a large numeric value range for primary identifiers that allows for many nodes. In some other embodiments, other primary identifier ranges, smaller or larger, may also be appropriate. For example, in one embodiment, the primary identifier range may be the range of primary identifiers that would fill a 32-bit integer. A 32-bit integer primary identifier range reduces the available number of nodes and records possible in a multi-master system, but may be appropriate in a legacy multi-master database system using a 32-bit operating system. In another example embodiment, the primary identifier range may be the range of primary identifiers that would fill a 128-bit, 256-bit, or even larger integer. These larger primary identifier ranges may be appropriate for example when a higher number of nodes or a higher number of unique identifiers require higher ranges to ensure that primary identifier collisions are avoided in the multi-master database system. The systems and methods described herein can be applied to any primary identifier range regardless of the size of the primary identifier range.

—Creating Objects Without Risk of Collision—

Figure 5:
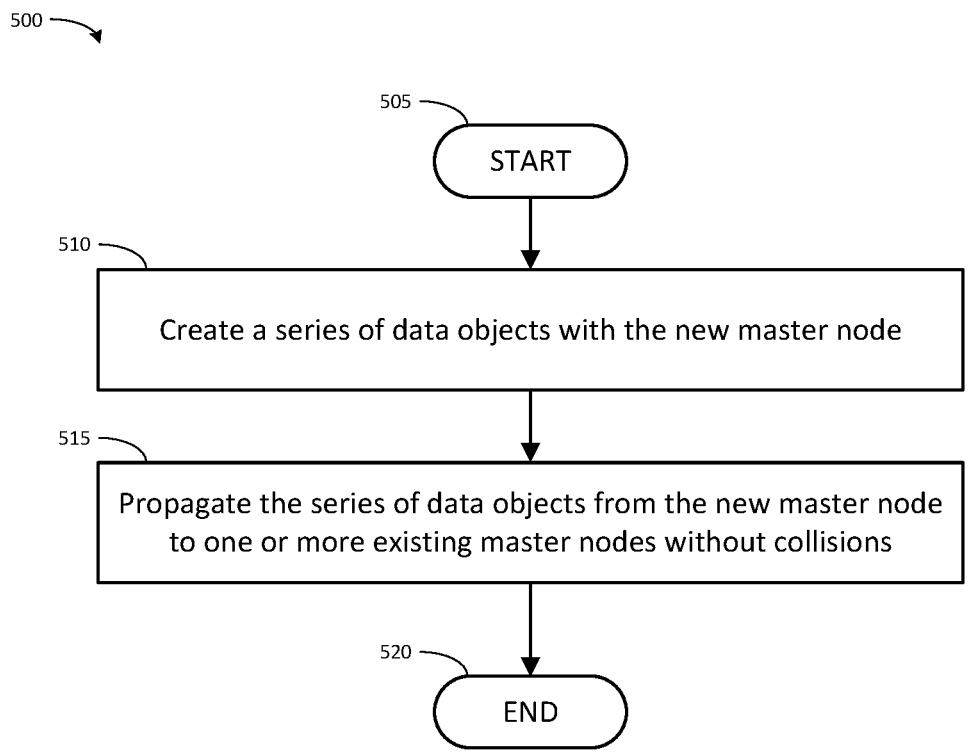
FIG. 5 illustrates one embodiment of a method associated with creating data objects in the multi-master database system without risk of collision.

FIG. 5 shows one embodiment of a method 500 for creating data objects in the multi-master database system without risk of collision. In one embodiment, method 500 is initiated following a process for adding a master node to a multi-master database system with an unknown or changing number of master nodes, with distributed management of the assignment of unique identifiers to avoid collisions in the multi-master database system, such as method 200. The method 500 may be initiated based on various triggers, such as receiving a signal over a network or parsing stored data indicating a series of one or more data objects are to be created by the new master node. For example, method 500 may be initiated in response to receiving a signal over a network or parsing stored data indicating that a user (or administrator) of the multi-master database system has performed one or more operations that requests or causes the creation of a new data object.

The method 500 initiates at START block 505 in response to parsing a signal received or stored data retrieved and determining that the signal or stored data indicates that the method 500 should begin. Processing continues to process block 510.

At process block 510, the processor creates one or more data objects with the new master node.

In one embodiment, at this step, the processor includes the processor of the computing hardware configured as the new master node. The processor receives an electronic message including a command to create a new data object over a network from a computing device associated with a user of the multi-master database system. In one embodiment, the electronic message is a REST API request. The processor parses the electronic message to identify the command to create the new data object. In one embodiment, where a local counter has been configured to start counting from the numeric base, the processor retrieves the current value of the local counter and assigns it to be the primary identifier of the new data object, and increments the local counter. In another embodiment, where the local counter has been configured to start counting from 0, the processor retrieves the current value of the local counter, adds the numeric base to the current value, assigns the resulting sum to be the primary identifier of the new data object, and increments the local counter. The processor then creates the data object including the primary identifier and stores the data object as a data structure in memory. In one embodiment, the primary identifier is placed in the Oracle® identity column for the data object. In one embodiment, the processor stores the data object in the database local to the new master node. In one embodiment, this process may repeat to create a series of more than one data object. In another embodiment, this process may occur only once, creating only one data object, before processing completes.

Once the processor has thus completed creating one or more data objects with the new master node, processing at process block 510 completes, and processing continues to process block 515.

At process block 515, the processor propagates the one or more data objects from the new master node to one or more existing master nodes.

In one embodiment, the processor detects the creation of the one or more data objects in the database associated with the new master node. In one embodiment, in response to the detection the processor generates an electronic message including the one or more data objects and transmits it over a network to the existing (other) master nodes. In another embodiment the processor adds the one or more data objects to a queue or other data structure in memory of data objects to be propagated to the other existing master nodes. At a scheduled interval (if objects are present in the queue), or once the queue includes a certain number of data objects, the processor generates an electronic message including the one or more data objects in the queue and transmits it over a network to the existing (other) master nodes. In one embodiment, these electronic messages are REST API requests.

During this propagation no primary identifier of any object in the one or more data objects collides with any primary identifier of any data object created by the one or more existing master nodes. Collisions are prevented because the primary identifier of each data object created includes the numeric base generated for the new master node, while each other data object created by the one or more existing master nodes includes a different numeric base associated with the existing master node that created that other data object.

In one embodiment, the existing master nodes receive the electronic message including the one or more data objects, and parse the message to extract the objects. Because the numeric base for each master node in the multi-master database system is unique within the multi-master database system, and the numeric base of the master node is the base of the range for all primary identifiers generated by that master node, data objects generated by one master node can be added to the databases of all other master nodes in the multi-master database system without fear of collision. Thus, all the existing master nodes add the one or more data objects to their respective databases in the primary identifier range defined by the numeric base for the new master node.

Once the processor has thus completed propagating the one or more data objects from the new master node to one or more existing master nodes, processing at process block 515 completes, and processing continues to END block 520, where process 500 ends.

—Removal and Addition of Nodes Without Quiescing Other Nodes—

Figure 6:
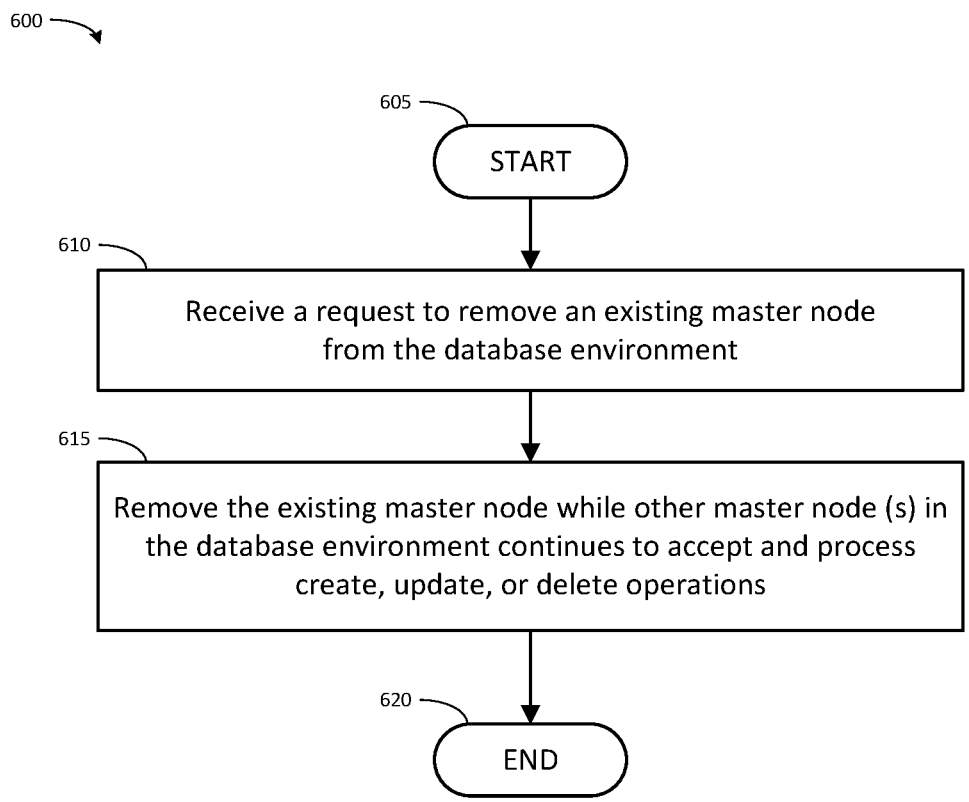
FIG. 6 illustrates one embodiment of a method associated with removing a master node from the multi-master database system while other master nodes in the multi-master database system continue normal operation.

FIG. 6 shows one embodiment of a method 600 for removing a master node from the multi-master database system while other master nodes in the multi-master database system continue normal operation. The method 600 may be initiated on various triggers, such as receiving a signal over a network or parsing stored data indicating that a master node should be removed from the multi-master database system. In one embodiment, the method 600 may be initiated in response to receiving a signal over a network or parsing stored data indicating that a user (or administrator) of the multi-master database system has performed one or more operations that requests the removal of a master node. For example, the user may determine that there is no further need for the master node in the multi-master database system, while there is a need for further use of other master nodes in the multi master system, and enter a command that discontinues use of the master node. The method 600 initiates at START block 605 in response to parsing a signal received or stored data retrieved and determining that the signal or stored data indicates that the method 600 should begin. Processing continues to process block 610.

At process block 610, the processor receives a request to remove an existing master node from the multi-master database environment.

In one embodiment, at this step, the processor includes one or more processors operating in the control plane. The processor accepts a message received over a network. This message may be from a software module configured to operate a graphical user interface of customer controls or account controls, and the message may be sent by that module in response to a customer's selection of an option to remove an existing master node from the multi-master database environment. In one embodiment, the electronic message is a REST API request. The processor parses the received request to determine (i) whether the message includes a request to remove an existing master node from the multi-master database environment, and if so (ii) the existing master node to be removed. If the message includes a request to remove an existing master node, both an indication that a node is to be removed and an indication that the existing master node is the node to be removed are stored in a data structure in memory.

Once the processor has thus completed receiving a request to remove an existing master node from the multi-master database environment, processing at process block 510 completes, and processing continues to process block 615.

At process block 615, the processor removes the existing master node from the multi-master database environment while at least one other master node in the multi-master database environment continues to accept and process create, update, or delete operations.

This step may begin in response to the creation in memory of the indication that the node is to be removed and the indication of the node to be removed. In one embodiment, at this step, the processor includes one or more processors operating in the control plane. The processor retrieves the indication that the node is to be removed and the indication of the node to be removed from memory. The processor generates an instruction to quiesce (or stop) the existing master node (the node to be removed) and transmits it to the existing master node. The processor generates an instruction to cease propagating data objects from other nodes to the existing master node, and records the instruction in a data structure in memory that controls the destinations of data objects within the multi-master database environment. For example, the instruction to cease propagating data objects to the existing master node may simply be the removal of the existing master node from a list of destinations that data objects should be propagated to that is maintained by the control plane. The control plane then manages data object propagation accordingly.

Once the processor has thus completed removing the existing master node from the multi-master database environment while at least one other master node in the multi-master database environment continues to accept and process create, update, or delete operations, processing at process block 615 completes, and processing continues to END block 620, where process 600 ends.

Similarly, in one embodiment the processor adds the new master node to the multi-master database environment while at least one other master node in the multi-master database environment continues to accept and process create, update, or delete (CRUD) operations.

This continued operation of the at least one other master node is made possible by universally storing data objects across the master nodes in a range of identifiers that is dedicated to the generating master node (defined by the numeric base) as described herein. Absent a need to reconfigure the one or more other master nodes to adjust its storage procedures following the addition or removal of a master node, operations of the one or more other master nodes may continue CRUD operations without interruption due to the addition or removal.

Example Use Case—Regional Support

In one embodiment, the request to add the new master node is generated in response to a request for additional multi-master database environment support in a selected region. Here, computing hardware in the region will be configured (for example, by the control plane) to be the new master node.

In one embodiment, first computing hardware is located in a first region, the first computing hardware including a first processor connected to a first memory that are configured by first computer-executable instructions to operate as an existing master node. Also, second computing hardware located in a second region, the second computing hardware including a second processor connected to a second memory that are configured by second computer-executable instructions to accept instructions from a control plane of the database environment. The request to add the new master node is generated in response to a request for additional multi-master database environment support in the second region. The instructions cause the computer to add the second computing hardware as the new master node while the existing master node continues to accept and process create, update, or delete operations.

In one embodiment, the new master node is added to the multi-master database environment while an existing master node in the database environment continues to accept and process create, update, or delete operations without additional configuration regarding the new master node. Similarly, a master node may be removed from the multi-master database environment while other nodes in the environment continues to accept and process create, update, or delete operations without additional configuration regarding the removed master node. Both the addition and removal of master nodes without additional configuration to other master nodes in the environment are enabled by the assignment to each master node of a unique numeric base for the node. Adding a master node to the multi-master environment simply causes data objects to commence being created with primary identifiers in a new section of the possible identifier range—the section associated with the new master node. Removing a master node from the multi-master environment simply causes data objects with primary identifiers in the section of the possible identifier range associated with the removed master node to cease being created. Thus, no additional configuration to the other nodes is required. The other nodes simply continue to accept incoming new data objects and changes to data objects propagated by other nodes.

Figure 7:
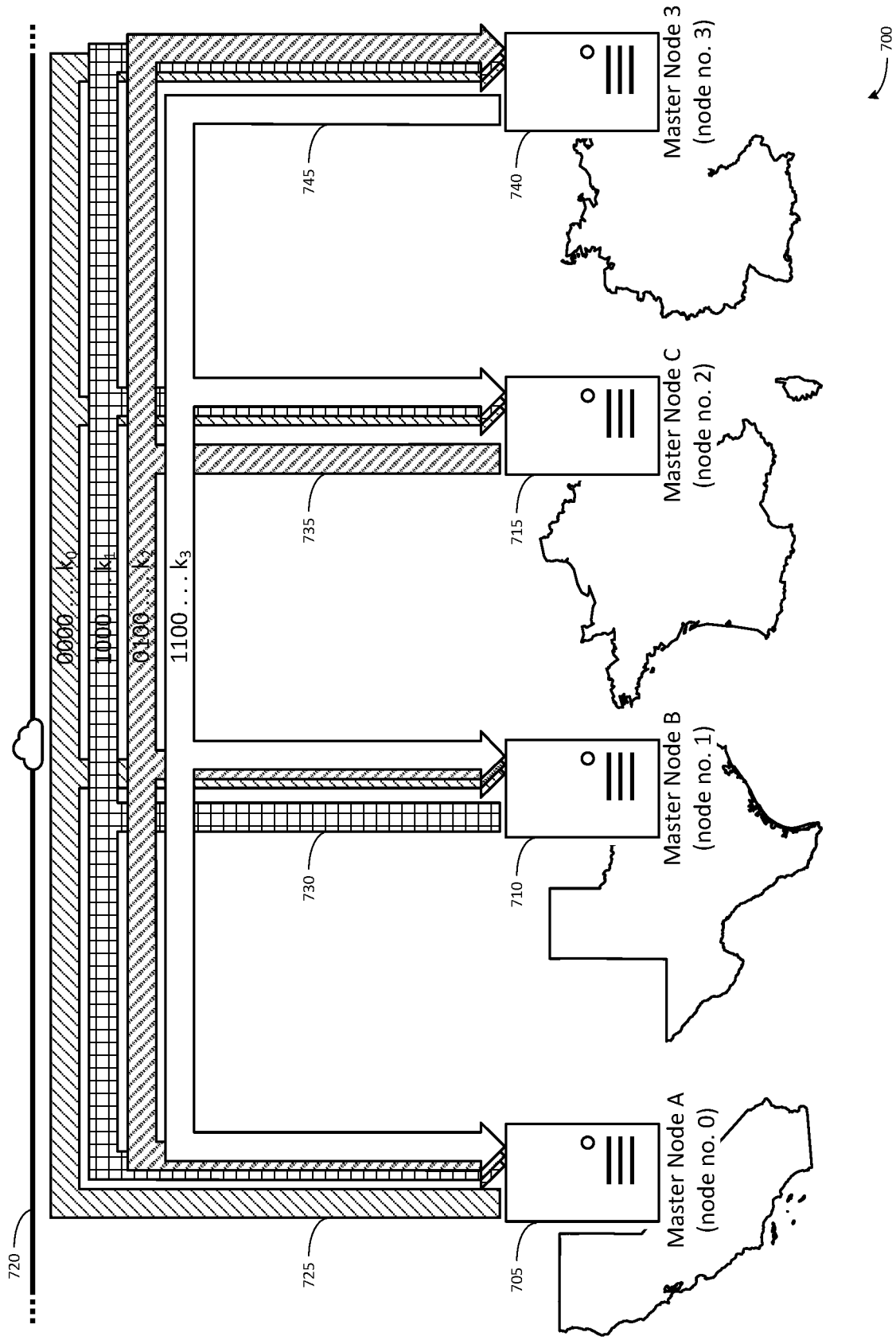
FIG. 7 illustrates one example multi-master database system showing how object identifier collisions are avoided when adding a new master node for additional regional support to users of the multi-master database system.

FIG. 7 illustrates one example multi-master database system 700 showing how object identifier collisions are avoided when adding a new master node for additional regional support to users of the multi-master database system. Initially, the multi-master database environment has 3 master nodes, master nodes A (705), B (710), and C (715). Master node A (705) is located in California. Master node B (710) is located in Texas. Master node C (715) is located in France. The master nodes are interconnected by a network 720, such as the Internet. Each of master nodes A (705), B (710), and C (715) is connected by a network to one or more computing devices of users (not shown) that access the services provided by the master node. Generally, the users of a master node are more proximate to that master node (either by distance or by speed of network access) than to the other master nodes.

Each of the master nodes is configured to generate data objects and propagate the objects they generate to the other master nodes. The master nodes are each configured to assign a 64-bit primary identifier to the data objects. A data object created by a particular master node is assigned the value of the sum of a local counter local to that master node and a numeric base associated with that master node. The local counter is incremented as each object is created. The numeric base is developed as described above, for example as described with reference to FIG. 3.

Master node A is given node number "0" before commencing database operations. Master node A (705) is configured to generate data objects with primary identifiers being the sum of the present value of a local counter $k_0$ plus a numeric base of 0x0000000000000000, derived from node number "0." Master node B is given node number "1" before commencing database operations. Master node B (710) is configured to generate data objects with primary identifiers being the sum of the present value of a local counter $k_1$ plus a numeric base of 0x8000000000000000, derived from node number "1." Master node C is given node number "2" before commencing database operations. Master node C (715) is configured to generate data objects with primary identifiers being the sum of the present value of a local counter $k_2$ plus a numeric base of 0x4000000000000000, derived from node number "2."

In operation, master node A (705) stores the data objects that it generates in its database using the primary identifier range starting with the numeric base of 0x0000000000000000. Master node A (705) propagates the data objects it creates to master nodes B (710) and C (715) as shown by arrow 725. The data objects propagated by master node A (705) to master nodes B (710) and C (715) are stored by master nodes B (710) and C (715) in their databases in the primary identifier range starting with the numeric base of 0x0000000000000000. Thus, the data objects created by master node A (705) do not collide with the data objects created by master nodes B (710) or C (715) in any of the databases of master nodes A (705), B (710), or C (715), because they all occupy a unique primary identifier range defined by the numeric base 0x0000000000000000.

In operation, master node B (710) stores the data objects that it generates in its database using the primary identifier range starting with the numeric base of 0x8000000000000000. Master node B (710) propagates the data objects it creates to master nodes A (705) and C (715) as shown by arrow 730. The data objects propagated by master node B (710) to master nodes A (705) and C (715) are stored by master nodes A (705) and C (715) in their databases in the primary identifier range starting with the numeric base of 0x8000000000000000. Thus, the data objects created by master node B (710) do not collide with the data objects created by master nodes A (705) or C (715) in any of the databases of master nodes A (705), B (710), or C (715), because they all occupy a unique primary identifier range defined by the numeric base 0x8000000000000000.

In operation, master node C (715) stores the data objects that it generates in its database using the primary identifier range starting with the numeric base of 0x4000000000000000. Master node C (715) propagates the data objects it creates to master nodes A (705) and 1 as shown by arrow 735. The data objects propagated by master node C (715) to master nodes A (705) and B (710) are stored by master nodes A (705) and B (710) in their databases in the primary identifier range starting with the numeric base of 0x4000000000000000. Thus, the data objects created by master node C (715) do not collide with the data objects created by master nodes A (705) or B (710) in any of the databases of master nodes A (705), B (710), or C (715), because they all occupy a unique primary identifier range defined by the numeric base 0x4000000000000000.

Thus, the data objects created by each individual master node are inserted into each of the databases of the master nodes in a region of primary identifiers that is unoccupied by the data objects of any other master node. As discussed elsewhere in this application, many, many data objects would need to be created by a given node in the multi-master database system before there would be any risk of collision.

In some situations, users of the multi-master database system that are located in Germany may be dissatisfied with the performance of their access to the multi-master database system. Or, regulatory requirements may prevent the use of database nodes outside of Germany for the type of information that users located in Germany are using multi-master database system to store or process. In these example situations, specific regional support in Germany may be indicated. A customer of the multi-master database system may access customer tools (such as account management tools) allowing the purchase of additional multi-master database system support on a node located in Germany, master node D (740). When the customer purchases the additional multi-master database system support local to Germany, a request is sent to the control plane to add an additional node located in Germany (such as master node 3) to the multi-master database system. In response, the control plane configures the computing hardware of master node 3 to be a master node of the multi-master database system.

Master node 3 is configured similarly to master nodes A (705), B (710), and C (715). In one embodiment, an initial stage, master node 3 accesses its node number, "3," and derives a numeric base from that node number (as described with reference to FIGS. 2 and 3). In another embodiment, during the configuration of master node 3, the control plane determines the node number, "3" of master node 3, and derives the numeric base from that node number. In either embodiment, master node D (740) is configured to generate data objects with primary identifiers being the sum of the present value of a local counter $k_3$ plus numeric base of 0xC000000000000000 derived from the node number.

In operation, master node D (740) stores the data objects that it generates in its database using the primary identifier range starting with the numeric base of 0xC000000000000000. Master node D (740) propagates the data objects it creates to master nodes A (705), B (710), and C (715) as shown by arrow 745. The data objects propagated by master node D (740) to master nodes A (705), B (710), and C (715) are stored by master nodes A (705), B (710), and C (715) in their databases in the primary identifier range starting with the numeric base of 0xC000000000000000. Thus, the data objects created by master node D (740) do not collide with the data objects created by master nodes A (705), B (710), or C (715) in any of the databases of master nodes A (705), B (710), C (715), or D (740) because they all occupy a unique primary identifier range defined by the numeric base 0xC000000000000000.

The addition of master node D (740) to the multi-master database system requires no additional configuration of master nodes A (705), B (710), and C (715) because all data objects generated by master node D (740) are placed in a primary identifier address space of each of the master nodes that is unoccupied by data objects generated by master nodes A (705), B (710), and C (715). Therefore, none of master nodes A (705), B (710), and C (715) need to be quiesced or stopped for reconfiguration due to the addition of master node D (740). They will each simply accept and record in their respective databases the data objects propagated by master node D (740) as they previously accepted the data objects generated by the other preexisting nodes.

Thus, the German users may continue to perform operations using master node C (715) in France up until the moment master node D (740) in Germany is configured and added to the multi-master database system, and then seamlessly transition their activities to node D (740). Further, users of the other nodes A (705), B (710), and C (715) who are not transitioned to node D (740) will have no interruption in their activities, and may continue to perform CRUD operations in the multi-master database system. Each of these features is achieved because the data objects generated by a master node in the multi-master database system are stored in the database of each master node in a range of identifiers that is dedicated to the generating master node (defined by the numeric base).

In some situations, with the addition of master node D (740) in Germany, users of the multi-master database system that were previously served by master node C (715) in France may be equally well served by master node D (740), rendering master node C (715) redundant. A customer of the multi-master database system may access customer tools (such as account management tools) allowing the removal of master nodes such as master node C (715). When the customer requests the removal of master node C (715) a request is sent to the control plane to remove master node C (715) from the multi-master database system. In response, the control plane quiesces (or stops) master node C (715), and removes it from the multi-master database system. The computing hardware that acted as master node C (715) is now available to be configured to perform other tasks.

The removal of master node C (715) from the multi-master database system requires no additional configuration of master nodes A (705), B (710), and D (740) because all data objects generated by master node C (715) that were placed in a primary identifier address space of each of the master nodes that is unoccupied by data objects generated by master nodes A (705), B (710), and D (740) remain in place (unless otherwise deleted). Therefore, none of master nodes A (705), B (710), and D (740) need to be quiesced or stopped for reconfiguration due to the removal of master node C (715). There will simply be no further data objects added to the primary identifier address space reserved for master node C (715) by any master node.

In one embodiment, the node number, "2," and current value of the local counter kc for master node C (715) may be sent by electronic message (such as a REST API request) to the control plane 1xx for storage and later retrieval, in the event that master node C (715) is reestablished.

Thus, the users of master node C (715) may continue to perform operations using master node C (715) up until the moment master node C (715) is quiesced, and then seamlessly transition their activities to any of A (705), B (710), and D (740) as directed by the control plane. Further, users of the other nodes A (705), B (710), and D (740) will have no interruption in their activities, and may continue to perform CRUD operations in the multi-master database system. Each of these features is achieved because the data objects generated by a master node in the multi-master database system are stored in the database of each master node in a range of identifiers that is dedicated to the generating master node (defined by the numeric base).

Additional master nodes may be added to and other master nodes removed from this example multi-master database environment in the manner described above. As long as there is at least one master node operating in the multi-master database environment, the users of the multi-master database environment will be able to continue to perform CRUD operations.

Some Example Advantages

The systems and methods described herein clearly improves the technical field of multi-master database systems by allowing addition or removal of master nodes on-the-fly, without requiring that all existing master nodes in the database system first be quiesced or stopped for the reconfiguration. This first practical application has a number of further practical applications. For architectures that require cross-region support, this approach enables the cross-region support. Adding a new region provides better performance and distributes the load of typical systems. Removing a node can reduce costs if appropriate. Having a system that can do this without re-configuring all other nodes provides a scalable system independent of the number of nodes used.

The systems and methods described herein clearly improves the technical field of multi-master database systems by enabling the management of the assignment of unique identifiers across an unknown or changing number of master nodes to avoid collisions in a multi-master database system to be distributed, rather than managed at the control plane level. Having a system that manages unique identifiers to prevent collisions in a distributed manner removes the overhead and delay associated with managing this at the control plane level.

Further, while inadvertent failure of a node is not anticipated, the systems and methods described herein improve the technical field of multi-master database systems by enhancing robust failover. As each node generates new data objects with primary identifiers in a primary identifier range dedicated to the generating node, even an unplanned stop or failure by a master node does not affect the generation of primary identifiers in other, non-failing, master nodes, and allows the other nodes to continue operations until the failed master node recovers.

In another advantage, the systems and methods described herein facilitate conversion of a single-master database system to a multi-master database system without reprocessing the data objects because the numeric base for the first master node, node 0, is 0x0000000000000000 (in 64-bit examples). Thus, so long as the single-master database system uses as a primary identifier an unsigned integer of the same length as a new master database added to the database system, the primary identifier of the data objects created by the single-master database need not be modified. The data objects of the new additional master will be given a numeric base of 0x8000000000000000, and will not collide in the new multi-master database system with the data objects created by the single-master database.

In still another advantage, the systems and methods described herein facilitate addition of a single-master database system to a multi-master database system. Where an existing single-master database system is to be added to a multi-master database system, the data objects of the single-master database system need only have the numeric base of the new node added to the identifier of each data object to make the data objects compatible with the multi-master database system. (The single-master database system may either becomes the new node itself, or the single-master database system may be replaced by a new node including the data of the single-master database system).

Selected Embodiment

In one embodiment, a non-transitory computer-readable medium storing computer-executable instructions is presented. When executed by at least a processor of a computer, the instructions cause the computer to receive, by at least the processor, a request to add a new master node to a multi-master database environment. The instructions cause the computer to retrieve, by at least the processor, the next available master node number from a master node counter for the database environment. The instructions cause the computer to generate, by at least the processor, a numeric base for primary identifiers of data objects of the new master node by deriving high order bits of the numeric base from the retrieved master node number. The instructions cause the computer to configure, by at least the processor, the new master node to assign the next unassigned number in a sequence of numbers beginning with the numeric base as the primary identifier for each data object created by the new master node. The instructions cause the computer to add, by at least the processor, the new master node to the database environment.

In a further embodiment, the non-transitory computer-readable medium further comprises instructions that when executed by at least the processor cause the computer to derive the high order bits from the retrieved master node number by: (i) computing an equivalent binary value of the retrieved master node number; (ii) reversing the bit order of the equivalent binary value to form the binary value; and (iii) replacing the high order bits of a primary identifier range for the database environment with the reversed binary value to form the numeric base.

In a further embodiment, the non-transitory computer-readable medium further comprises instructions that when executed by at least the processor cause the computer to: (i) create one or more data objects with the new master node; and (ii) propagate the one or more data objects from the new master node to one or more existing master nodes, wherein no primary identifier of any object in the one or more data objects collides with any primary identifier of any data object created by the one or more existing master nodes.

In a further embodiment, the non-transitory computer-readable medium further comprises instructions that when executed by at least the processor cause the computer to: (i) receive a request to remove an existing master node from the multi-master database environment; and (ii) remove the existing master node from the multi-master database environment while at least one other master node in the multi-master database environment continues to accept and process create, update, or delete operations.

In a further embodiment, the instructions cause the computer to add the new master node to the multi-master database environment while at least one other master node in the multi-master database environment continues to accept and process create, update, or delete operations.

In a further embodiment, the primary identifier range is the range of primary identifiers that would fill a 64-bit integer.

In a further embodiment, where the request to add the new master node is generated in response to a request for additional multi-master database environment support in a selected region, the non-transitory computer-readable medium further comprises instructions that when executed by at least the processor cause the computer to configure computing hardware in the region to be the new master node.

In one embodiment, a computer implemented method is presented. The method comprises a step of receiving a request to add a new master node to a multi-master database environment. The method comprises a step of retrieving the next available master node number from a master node counter for the database environment. The method comprises a step of generating a numeric base for primary identifiers of data objects of the new master node by deriving high order bits of the numeric base from the retrieved master node number. The method comprises a step of configuring the new master node to assign the next unassigned number in a sequence of numbers beginning with the numeric base as the primary identifier for each data object created by the new master node. The method comprises a step of adding the new master node to the database environment.

In a further embodiment, the deriving the high order bits from the retrieved master node number comprises steps of (i) computing an equivalent binary value of the retrieved master node number; (ii) reversing the bit order of the equivalent binary value to form the binary value; and (iii) replacing the high order bits of a primary identifier range for the database environment with the reversed binary value to form the numeric base.

In a further embodiment, the method further comprises steps of: (i) creating one or more data objects with the new master node; and (ii) propagating the one or more data objects from the new master node to one or more existing master nodes, wherein no primary identifier of any object in the one or more data objects collides with any primary identifier of any data object created by the one or more existing master nodes.

In a further embodiment, the method further comprises steps of: (i) receiving a request to remove an existing master node from the multi-master database environment; and (ii) removing the existing master node from the multi-master database environment while at least one other master node in the multi-master database environment continues to accept and process create, update, or delete operations.

In a further embodiment of the method, the new master node is added to the multi-master database environment while at least one other master node in the multi-master database environment continues to accept and process create, update, or delete operations.

In a further embodiment of the method, the primary identifier range is at least the range of primary identifiers that would fill a 64-bit integer.

In a further embodiment, wherein the request to add the new master node is generated in response to a request for additional multi-master database environment support in a selected region, the method further comprises configuring computing hardware in the region to be the new master node.

In one embodiment, a computing system comprising at least one processor connected to at least one memory and a non-transitory computer-readable medium including instructions is presented. When the instructions are executed by at least the processor and memory cause the computing system to receive, by at least the processor, a request to add a new master node to a multi-master database environment. The executed instructions also cause the computing system to retrieve, by at least the processor, the next available master node number from a master node counter for the database environment. The executed instructions also cause the computing system to generate, by at least the processor, a numeric base for primary identifiers of data objects of the new master node by deriving high order bits of the numeric base from the retrieved master node number. The executed instructions also cause the computing system to configure, by at least the processor, the new master node to assign the next unassigned number in a sequence of numbers beginning with the numeric base as the primary identifier for each data object created by the new master node. The executed instructions also cause the computing system to add, by at least the processor, the new master node to the database environment.

In a further embodiment of the computing system, the instructions for deriving the high order bits from the retrieved master node number include instructions for computing an equivalent binary value of the retrieved master node number.

In a further embodiment of the computing system, the instructions for deriving the high order bits from the retrieved master node number include instructions for reversing the bit order of a binary value derived from the retrieved master node number to form a reversed binary value.

In a further embodiment of the computing system, the instructions for deriving the high order bits from the retrieved master node number include instructions for replacing the high order bits of a primary identifier range for the database environment with a binary value derived from the retrieved master node number to form the numeric base.

In a further embodiment of the computing system, the system further comprises first computing hardware located in a first region, the first computing hardware including a first processor connected to a first memory that are configured by first computer-executable instructions to operate as an existing master node. The system further comprises second computing hardware located in a second region, the second computing hardware including a second processor connected to a second memory that are configured by second computer-executable instructions to accept instructions from a control plane of the database environment. In this embodiment, the request to add the new master node is generated in response to a request for additional multi-master database environment support in the second region. Also, in this embodiment, the instructions further cause the computer to add the second computing hardware as the new master node while the existing master node continues to accept and process create, update, or delete operations.

In a further embodiment of the computing system, the new master node is added to the database environment while an existing master node in the database environment continues to accept and process create, update, or delete operations without additional configuration regarding the new master node.

In one embodiment, a computer implemented method is presented. The method comprises a step of receiving a request to add a new master node to a multi-master database environment. The method comprises a step of retrieving the next available master node number from a master node counter for the database environment. The method comprises a step of computing the equivalent binary value of the retrieved master node number. The method comprises a step of reversing the bit order of the equivalent binary value to form a reversed binary value. The method comprises a step of replacing the high order bits of a primary identifier range for the multi-master database environment with the reversed binary value to form a numeric base for the primary identifiers generated by the new master node. The method comprises a step of configuring the new master node to assign the next unassigned number in a sequence of numbers beginning with the numeric base as the primary identifier for each data object created by the new master node. The method comprises a step of add the new master node to the database environment.

Cloud or Enterprise Embodiments

In one embodiment, the multi-master database system 100 is a computing/data processing system including a database application or collection of distributed database applications. The applications and computing system 100 may be configured to operate with or be implemented as a cloud-based networking system, a software as a service (SaaS) architecture, or other type of networked computing solution. In one embodiment the multi-master database system 100 is a server-side application that provides at least the functions disclosed herein and that is accessed by many users via computing devices/terminals communicating with the multi-master database system 100 (functioning as the server) over a computer network.

Software Module Embodiments

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing a specific task, process, function, or operation. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

Computing Device Embodiment

Figure 8:
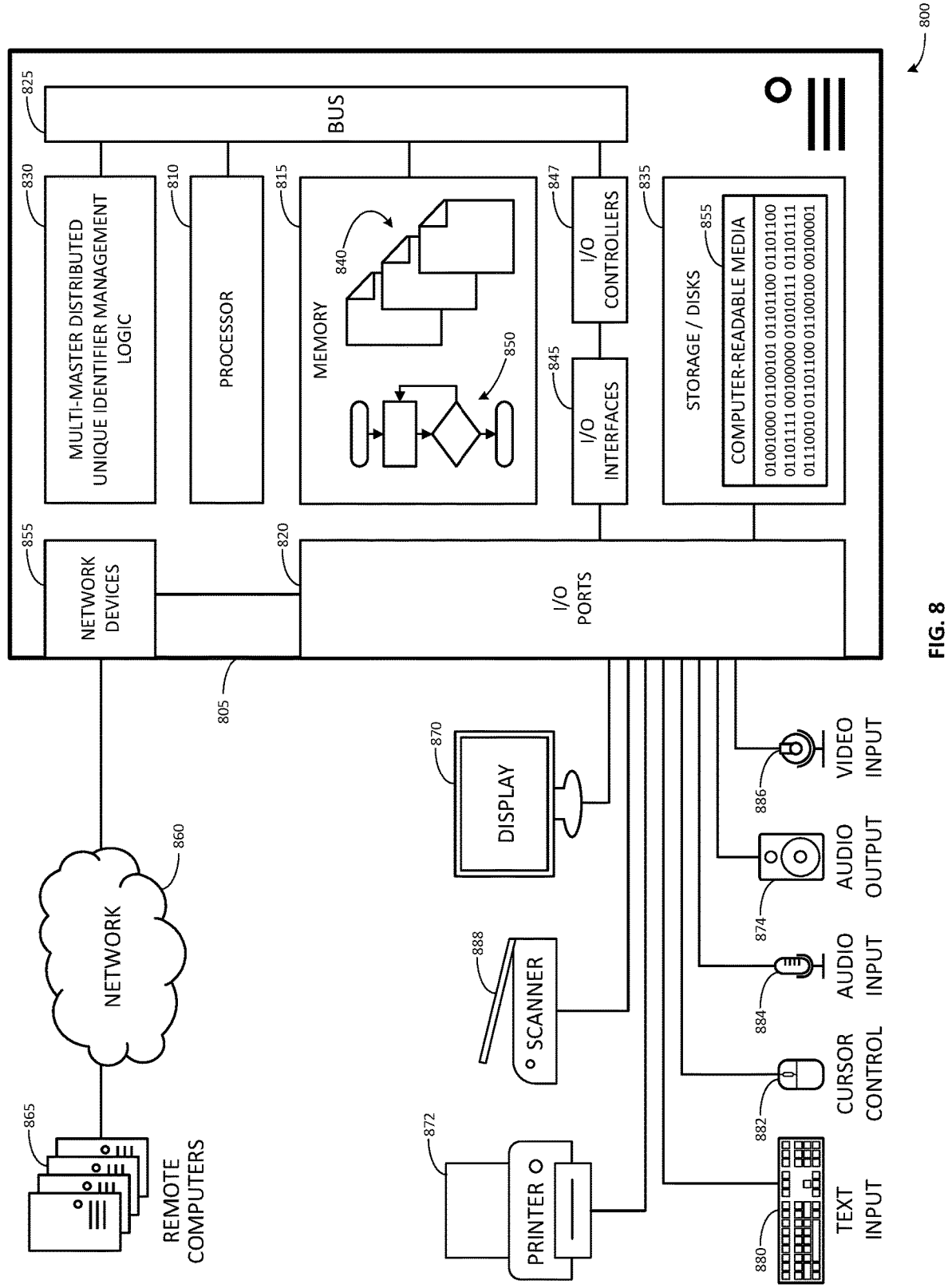
FIG. 8 illustrates an embodiment of a computing system configured with the example systems and/or methods disclosed.

FIG. 8 illustrates an example computing device that is configured and/or programmed with one or more of the example systems and methods described herein, and/or equivalents. The example computing device may be a computer 800 that includes a processor 802, a memory 804, and input/output ports 810 operably connected by a bus 808. In one example, the computer 800 may include Multi-Master Distributed Unique Identifier Management logic 830 configured to facilitate distributed management of the assignment of unique identifiers across an unknown or changing number of master nodes to avoid collisions in a multi-master database system similar to the logic, systems, and methods shown and described with reference to FIGS. 1-7. In different examples, the logic 830 may be implemented in hardware, a non-transitory computer-readable medium with stored instructions, firmware, and/or combinations thereof. While the logic 830 is illustrated as a hardware component attached to the bus 808, it is to be appreciated that in other embodiments, the logic 830 could be implemented in the processor 802, stored in memory 804, or stored in disk 806.

In one embodiment, logic 830 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to control distributed management of the assignment of unique identifiers across an unknown or changing number of master nodes to avoid collisions in a multi-master database system. The means may also be implemented as stored computer executable instructions that are presented to computer 800 as data 816 that are temporarily stored in memory 804 and then executed by processor 802.

Logic 830 may also provide means (e.g., hardware, non-transitory computer-readable medium that stores executable instructions, firmware) for performing distributed management of the assignment of unique identifiers across an unknown or changing number of master nodes to avoid collisions in a multi-master database system.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, PROM, EPROM, EEPROM and so on. Volatile memory may include, for example, RAM, SRAM, DRAM, and so on.

A storage disk 806 may be operably connected to the computer 800 via, for example, an input/output (I/O) interface (e.g., card, device) 818 and an input/output port 810. The disk 806 may be, for example, a magnetic disk drive, a solid-state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The computer 800 may interact with input/output (I/O) devices via the I/O interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the I/O interfaces 818, and/or the I/O ports 810. Through the network devices 820, the computer 800 may interact with a network. Through the network, the computer 800 may be logically connected to remote computers. Networks with which the computer 800 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
CRUD operation: create, read, update, and delete operations performed in a database.
DVD: digital versatile disk and/or digital video disk.
RAM: random access memory.

DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data record, a database, a data object, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection. Where two or more entities are described herein as "connected," the connection should be construed to be an operable connection, unless the context clearly indicates otherwise.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
   receive, by at least the processor, a request to add a new master node to a multi-master database environment;
   retrieve, by at least the processor, a next available master node number from a master node counter for the multi-master database environment;
   generate, by at least the processor, a numeric base for primary identifiers of data objects of the new master node by deriving high order bits of the numeric base from the retrieved master node number, wherein the derivation includes reversing a bit order of a binary value derived from the retrieved master node number;
   configure, by at least the processor, the new master node to assign the next unassigned number in a sequence of numbers beginning with the numeric base as the primary identifier for each data object created by the new master node; and add, by at least the processor, the new master node to the multi-master database environment.

2. The non-transitory computer-readable medium of claim 1, further comprising instructions that when executed by at least the processor cause the computer to derive the high order bits from the retrieved master node number by:
compute an equivalent binary value of the retrieved master node number;
reverse the bit order of the equivalent binary value to form a reversed binary value; and
replace the high order bits of a primary identifier range for the multi-master database environment with the reversed binary value to form the numeric base.

3. The non-transitory computer-readable medium of claim 1, further comprising instructions that when executed by at least the processor cause the computer to:
create one or more data objects with the new master node; and
propagate the one or more data objects from the new master node to one or more existing master nodes, wherein no primary identifier of any object in the one or more data objects collides with any primary identifier of any data object created by the one or more existing master nodes.

4. The non-transitory computer-readable medium of claim 1, further comprising instructions that when executed by at least the processor cause the computer to:
receive a request to remove an existing master node from the multi-master database environment; and
remove the existing master node from the multi-master database environment while at least one other master node in the multi-master database environment continues to accept and process create, update, or delete operations.

5. The non-transitory computer-readable medium of claim 1, wherein the instructions cause the computer to add the new master node to the multi-master database environment while at least one other master node in the multi-master database environment continues to accept and process create, update, or delete operations.

6. The non-transitory computer-readable medium of claim 1, wherein the primary identifier range is the range of primary identifiers that would fill a 64-bit integer.

7. The non-transitory computer-readable medium of claim 1, wherein the request to add the new master node is generated in response to a request for additional multi-master database environment support in a selected region, further comprising instructions that when executed by at least the processor cause the computer to configure computing hardware in the region to be the new master node.

8. A computer implemented method, the method comprising:
receiving a request to add a new master node to a multi-master database environment;
retrieving a next available master node number from a master node counter for the multi-master database environment;
generating a numeric base for primary identifiers of data objects of the new master node by deriving high order bits of the numeric base from the retrieved master node number, wherein the derivation includes reversing a bit order of a binary value derived from the retrieved master node number;
configuring the new master node to assign the next unassigned number in a sequence of numbers beginning with the numeric base as the primary identifier for each data object created by the new master node; and
adding the new master node to the multi-master database environment.

9. The method of claim 8, wherein the deriving the high order bits from the retrieved master node number comprises:
computing an equivalent binary value of the retrieved master node number;
reversing the bit order of the equivalent binary value to form a reversed binary value; and
replacing the high order bits of a primary identifier range for the multi-master database environment with the reversed binary value to form the numeric base.

10. The method of claim 8, further comprising:
creating one or more data objects with the new master node;
propagating the one or more data objects from the new master node to one or more existing master nodes, wherein no primary identifier of any object in the one or more data objects collides with any primary identifier of any data object created by the one or more existing master nodes.

11. The method of claim 8, further comprising:
receiving a request to remove an existing master node from the multi-master database environment; and
removing the existing master node from the multi-master database environment while at least one other master node in the multi-master database environment continues to accept and process create, update, or delete operations.

12. The method of claim 8, wherein the new master node is added to the multi-master database environment while at least one other master node in the multi-master database environment continues to accept and process create, update, or delete operations.

13. The method of claim 8, wherein the primary identifier range is at least the range of primary identifiers that would fill a 64-bit integer.

14. The method of claim 8, wherein the request to add the new master node is generated in response to a request for additional multi-master database environment support in a selected region, further comprising configuring computing hardware in the region to be the new master node.

15. A computing system, comprising:
at least one processor connected to at least one memory;
a non-transitory computer-readable medium including instructions that when executed by at least the processor and memory cause the computing system to:
receive, by at least the processor, a request to add a new master node to a multi-master database environment;
retrieve, by at least the processor, a next available master node number from a master node counter for the multi-master database environment;
generate, by at least the processor, a numeric base for primary identifiers of data objects of the new master node by deriving high order bits of the numeric base from the retrieved master node number, wherein the derivation includes reversing a bit order of a binary value derived from the retrieved master node number;
configure, by at least the processor, the new master node to assign the next unassigned number in a sequence of numbers beginning with the numeric base as the primary identifier for each data object created by the new master node; and add, by at least the processor, the new master node to the multi-master database environment.

16. The computing system of claim 15, wherein the instructions for deriving the high order bits from the retrieved master node number include instructions for computing an equivalent binary value of the retrieved master node number.

17. The computing system of claim 15, wherein the instructions for deriving the high order bits from the retrieved master node number include instructions for replacing the high order bits of a primary identifier range for the multi-master database environment with a binary value derived from the retrieved master node number to form the numeric base.

18. The computing system of claim 15, the system further comprising:
    first computing hardware located in a first region, the first computing hardware including a first processor connected to a first memory that are configured by first computer-executable instructions to operate as an existing master node;
    second computing hardware located in a second region, the second computing hardware including a second processor connected to a second memory that are configured by second computer-executable instructions to accept instructions from a control plane of the multi-master database environment;
    wherein,
      (i) the request to add the new master node is generated in response to a request for additional multi-master database environment support in the second region, and
      (ii) the instructions further cause the computer to add the second computing hardware as the new master node while the existing master node continues to accept and process create, update, or delete operations.

19. The computing system of claim 15, wherein the new master node is added to the multi-master database environment while an existing master node in the multi-master database environment continues to accept and process create, update, or delete operations without additional configuration regarding the new master node.

20. The computing system of claim 15, wherein the instructions cause the computing system to add the new master node to the multi-master database environment while at least one other master node in the multi-master database environment continues to accept and process create, update, or delete operations.

* * * * *

UNITED STATES PATENT AND TRADEMARK OFFICE
CERTIFICATE OF CORRECTION

| | |
|---|---|
| PATENT NO. | : 11,321,350 B2 |
| APPLICATION NO. | : 16/595587 |
| DATED | : May 3, 2022 |
| INVENTOR(S) | : Schrum |

It is certified that error appears in the above-identified patent and that said Letters Patent is hereby corrected as shown below:

In the Specification

In Column 6, Line 17, delete "requests." and insert -- requests). --, therefor.

In Column 8, Line 55, delete "that that" and insert -- that --, therefor.

In Column 11, Line 13, delete "3." and insert -- 3 --, therefor.

In Column 12, Line 41, delete "that that" and insert -- that --, therefor.

In Column 15, Lines 38-42, delete "The method 500 initiates at START block 505 in response to parsing a signal received or stored data retrieved and determining that the signal or stored data indicates that the method 500 should begin. Processing continues to process block 510." and insert the same on Column 15, Line 37 as a continuation of the same Paragraph.

In Column 28, Line 21, delete "on)" and insert -- on. --, therefor.

Signed and Sealed this
Twentieth Day of September, 2022

Katherine Kelly Vidal
*Director of the United States Patent and Trademark Office*